United States Patent Office 3,444,846
Patented May 20, 1969

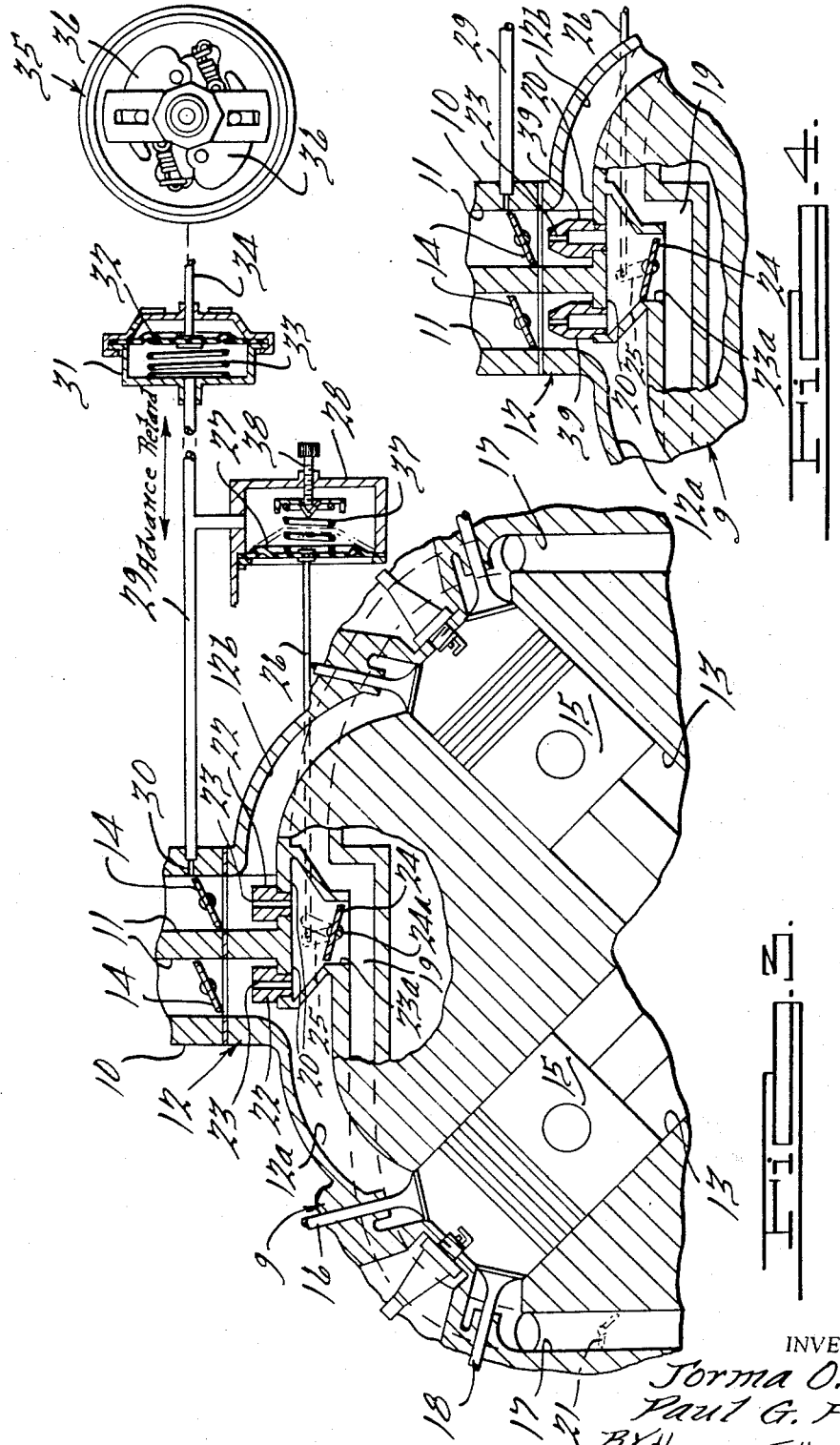

3,444,846
ENGINE EXHAUST RECIRCULATION
Jorma O. Sarto, Orchard Lake, and Paul G. Fouts, Jackson, Mich., assignors to Chrysler Corporation, Highland Park, Mich., a corporation of Delaware
Filed Apr. 24, 1967, Ser. No. 633,188
Int. Cl. F02m 25/06; F02b 75/22
U.S. Cl. 123—119         8 Claims

ABSTRACT OF THE DISCLOSURE

A restricted bypass duct connecting the fuel-air inlet header and exhaust header of an internal combustion engine extends in heat exchange relationship through the hot spot of the inlet header into the fuel-air induction conduit and terminates in a nozzle to direct combustion products against the throttle valve in a direction opposing the fuel-air flow and at a controlled rate responsive to pressure conditions in the headers and the restriction in the bypass duct, which may be variable in response to said pressure conditions, thereby to dilute the fuel-air inlet mixture with hot exhaust products and enhance vaporization of fuel in said inlet mixture as well as to reduce throttle icing by heating the hot spot, inlet mixture, and throttle valve, and to reduce the formation of noxious oxides of nitrogen in the exhaust by reducing the combustion temperature in consequence of dilution of the inlet mixture with the admixed combustion products.

Background and summary of the invention

In a conventional automobile engine, the upstream end of the inlet header comprises a fuel-air induction having an air inlet and extending through a carburetor mechanism which disperses fuel in the form of vapor and liquid droplets into the inlet air stream in a carbureting action. A wall portion of the inlet header comprises a hot spot in heat transfer relationship with the combustion products of the exhaust header to be heated thereby.

In the prior art, numerous systems have been devised to recycle exhaust gas into the induction system whereby the exhaust gases are cooled prior to their injection into the induction system. Among the purposes for recycling the exhaust gases according to the prior art is to pre-heat and vaporize the incoming air-fuel mixture to facilitate complete combustion of the mixture in the combustion zone. Another purpose for recycling exhaust gases according to the prior art is to re-use the unignited or partially burned portions of the fuel which would otherwise pass out the exhaust pipe and into the atmosphere. More recently it has been proposed to recycle exhaust gases into the induction system for the purpose of reducing the oxides of nitrogen emitted from the exhaust system into the atmosphere and thereby to reduce air pollution due to automotive engine exhaust. It has been found that approximately 15% exhaust gas recycling is required at moderate speeds to substantially reduce the nitrogen oxide content of the exhaust gases discharged in the atmosphere, that is, to below about 1000 parts per million.

One of the exhaust recycle system proposals contemplates returning exhaust gases from the tail pipe into the induction system whereby air cooling is effected by contacting the recycle tube with atmospheric air. Such systems, however, necessarily involve excessive "plumbing" or piping to convey the exhaust gases from the tail pipe to the induction system. It has also been found that this prior art type of recycle system entraps moisture which, during the warm-up period, may be drawn into the engine and cause rough engine operation and increased engine wear. Other exhaust recycle systems propose to inject the recycled gases above the air-fuel mixer or carburetor; but such systems foul the carburetor.

The Daigh Patent No. 3,237,615 for example, discloses means for circulating a portion of the exhaust gases through the hot spot and thence via a plurality of sidewall ports through the induction conduit transversely into the flow of the inlet fuel-air mixture at a location downstream of the throttle valve. The exhaust gas circulation through the spot is controlled by a valve coupled with the throttle valve for actuation conjointly therewith.

Although the prior art structures have had the desired effects of rapidly heating the hot spot and of reducing the content of nitrogen oxides in the exhaust by reducing the maximum combustion temperature in consequence of diluting the fuel-air mixture with recycled exhaust gases during certain operating conditions of the engine, the structures known heretofore have not been commercially acceptable from the standpoints of both cost and operating efficiency. At the outset, the mechanical linkage with the accelerator or throttle pedal increases the problems of throttle control because of the increased foot pedal force required to operate both the throttle valve and exhaust recycling valve when these are coupled together, and also because of the added cost and complexity required of the linkage to enable return of the throttle independently of the recycling valve in the event the later should jam. The coupling between the throttle and recycling valve is further complicated by the desirability of closing the latter during conditions of both engine idling when nitrogen oxide emission is no problem and wide open throttle when maximum power is required, while opening the recycling valve and progressively increasing the recycling of exhaust gases with increasing engine speed during cruising condition or with increasing engine load at part open throttle.

The nitrogen oxide emission is a direct function of combustion temperature and for that reason is not a critical problem during engine idling when the rate of fuel combustion and the consequent combustion temperature are minimal. Operation at wide open throttle conditions are ordinarily of short duration, so that nitrogen oxide emission is not a critical problem. In the usual gasoline or hydrocarbon fuel type engine, fuel combustion can take place at about 1,200° F. The formation of nitrogen oxides does not become particularly objectionable until the combustion temperature exceeds about 2,200° F., but the usual engine combustion temperature which increases with engine load or the rate of acceleration at any given speed frequently rises to about 2,500° F. It is known that the recycling of at least $\frac{1}{20}$ and not more than $\frac{1}{4}$ of the total exhaust gases through the engine, depending on the load or power demand, will reduce the combustion temperature to less than 2,200° F. The desired result is usually obtained with the ordinary engine upon the recycling of about 15% of the total exhaust gases during partially open throttle as aforesaid.

An important object of this invention is to provide improved means comprising a restricted recycling or bypass duct for recirculating a portion of the combustion products from the exhaust header to the inlet header of an automobile engine to overcome or avoid the foregoing problems and deficiencies of the prior art, as well as to achieve a number of important results including preheating and improved mixing and carburetion of the fuel-air mixture in the inlet header, the reduction of ice formation on the customary throttle blade, and the reduction of noxious nitrogen oxides in the exhaust.

Another object is to provide such a construction wherein the bypass duct extends in heat exchange relationship through the customary hot spot of the inlet header or manifold and terminates within the induction conduit in a nozzle directed to discharge hot exhaust gases upstream against the flow of the fuel-air mixture in the induction conduit and also against the usual throttle valve, thereby to provide simple, economical and effective means for accomplishing the foregoing as well as for preheating the hot spot and simultaneously cooling the exhaust gases in the bypass conduit below the fuel ignition temperature, and for diluting the fuel-air mixture with substantially incombustible exhaust gases to lower the combustion temperature in the engine and thereby reduce the formation of nitrogen oxides during the combustion process.

Another and more specific object is to provide such a bypass duct connecting the exhaust and inlet headers having its opposite ends in communication respectively with the exhaust header adjacent the hot spot and with inlet header downstream of the throttle valve, the bypass duct also having a fixed restriction therein dimensioned so that more than 5% but less than approximately 25% and usually about 15% of the total exhaust gases are conducted through the bypass duct when the pressure differential between said ends corresponds to cruising or part open throttle acceleration conditions.

By virtue of the fixed restriction dimensioned as described above in the bypass duct, communication will exist at all times between the exhaust and inlet headers and a portion of the hot exhaust gases will be directed against the throttle valve to prevent or minimize carburetor icing during engine idling when ice formation is most likely to occur. Of course the flow of the hot exhaust gases against the throttle blade will be even greater during cold engine idling when the throttle is held partially open by the usual fast idle cam during this condition, as is customary. In addition, within the range from idle to light or moderate load conditions, the total fluid flow and heat transfer through a fixed bypass or recycling orifice increases at any given engine speed with increasing engine load. For example in a conventional automobile engine, the pressure downstream of the throttle varies roughly in the neighborhood of from one half atmosphere during idling to approximately one atmosphere at wide open throttle, while the exhaust pressure simultaneously varies roughly from one to two atmospheres. These factors together with the corresponding increasing temperature changes under the light load conditions result in a desirable increase in the effectiveness of the exhaust recycling through the fixed restriction with increasing load or acceleration.

As the engine load or acceleration decreases and the speed increases to the cruising condition, the combustion temperature and the pressure differential across the fixed restriction, as well as the total quantity of exhaust gases, decrease and the rate of exhaust recycling declines for improved fuel economy, again as desired because less recycling is required to maintain the combustion temperature below the level at which nitrogen oxide formation is objectionable. As the pressure differential between the inlet and exhaust headers increases with increasing load, the effective resistance of the fixed restriction to the recycling flow increases because the flow rate varies approximately as the square root of the pressure differential. Thus at wide open throttle, the proportion of the total exhaust gases that is recycled is somewhat less than the proportion recycled at partially open throttle. This factor also is as desired because the aforesaid excess fuel enrichment at wide open throttle in cooperation with the recycled exhaust gases is adequate to prevent overheating during the combustion process and reduce the formation of nitrogen oxides to the tolerable level.

Other objects are to provide such a bypass duct having a variable orifice, which may be in series with a fixed restriction and which is controlled by the pressure in at least one of said headers; and in particular to provide a pressure responsive bypass valve means for opening or closing the variable orifice in response to decreasing or increasing pressure respectively in the conventional distributor vacuum advance conduit. The latter conduit communicates with the induction conduit immediately above the upper edge of the blade of a conventional butterfly type throttle valve, so as to apply nearly atmospheric pressure to the distributor vacuum advance conduit during idling and wide open throttle conditions and to progressively reduce the pressure in the latter conduit with increasing engine speed during partially open throttle conditions, as is customary, thereby to close or restrict the variable bypass orifice to assure optimum engine performance during operating conditions when the problem of nitrogen oxide emission is least critical, and to progressively open the variable bypass orifice with increasing load at any given engine speed to progressively increase the recycling of exhaust gases through the engine during operating conditions that would otherwise form nitrogen oxides in objectionably increasing proportions.

In climatic regions where carburetor icing is infrequent, the bypass valve means can be adjusted to completely close the bypass orifice during normal engine idling, otherwise the bypass valve means can be adjusted to allow limited recycling of hot exhaust gases during idling, which gases are then directed against the throttle valve to minimize ice formation. Even when the bypass valve means is adjusted to completely close the bypass orifice during normal warm engine idling, during cold engine idling, the customary fast idle mechanism will partially open the throttle and reduce the pressure in the distributor vacuum advance conduit and thereby at least partially open the bypass valve means and reduce carburetor icing until the engine attains its normal warm operating condition.

The bypass valve means is adjusted to close during fast acceleration or heavy load near wide open throttle when the pressure in the distributor vacuum advance conduit rises to approximately five inches of mercury below atmospheric, at which operating condition the conventional carburetor operates to enrich the fuel-air mixture for the required power. Closing of the bypass valve means is preferably rapid during such conditions and may start at about seven inches of mercury below atmospheric pressure. The closing will usually be complete when the pressure rises approximately two more inches of mercury.

If the bypass or recycling valve means is designed to permit limited recycling at the closed position, it will also admit some recycling at wide open throttle when optimum power is required. A suitable compromise must be made between the desirability of completely closing the bypass valve means at wide open throttle for maximum power and the desirability of reducing nitrogen oxides in the exhaust. The decision will depend upon the type of engine involved and its intended operating conditions. Usually the extent of wide open throttle operation will be nominal and the nitrogen oxide problem during such operation will not be significant.

Other objects of this invention will appear in the following description and appended claims, reference being had to the accompanying drawings forming a part of this specification wherein like reference characters designate corresponding parts in the several views.

*Brief description of the drawings*

FIGURES 2, 3 and 4 are views similar to FIGURE 1, showing modifications.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Description of the preferred embodiments

Figure 1:
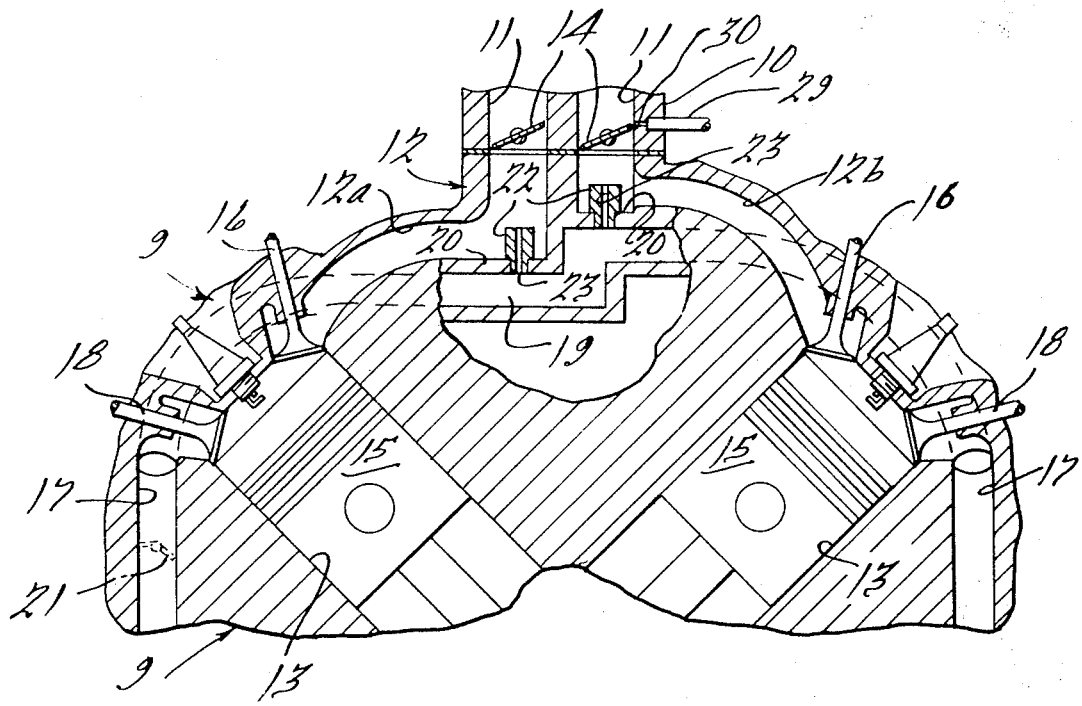
FIGURE 1 is a schematic fragmentary cross sectional view through an automobile engine showing an embodiment of the present invention.

Referring to FIGURE 1, an application of the present invention is illustrated by way of example with an automobile engine 9 having a carburetor 10 providing the inlet fuel-air induction conduit 11, which comprises the upstream portion of an inlet header 12 for supplying a combustible fuel and air mixture to the engine cylinders 13. In the present instance a two-barrel carburetor 10 is disclosed which may comprise any conventional type and which has the usual air inlet at the upstream end of the conduit 11, the usual fuel metering system and nozzles or jets for supplying idle and operating fuel to the conduit 11 during various operating conditions and for enriching the fuel supply during acceleration and wide open throttle, and the usual automatic choke and thermostatic means for controlling idle enrichment and fast idle operation during cold starting conditions. An example of such a carburetor is illustrated by way of example in Ball Patent No. 2,966,344, so that the foregoing conventional features are not described in detail herein.

The downstream portion of the induction conduit 11 comprises the customary throttle body which bifurcates in the present instance and contains the two conventional butterfly type throttle valves 14. The inlet fuel-air mixture is conducted via the headers or manifolds 12a and 12b, comprising extensions of the header 12, to the left and right banks of cylinders 13 respectively in timed relation with operation of the engine pistons 15 and inlet valves 16. After combustion of the fuel-air mixture above the pistons 15 within the cylinders 13, the exhaust gases are conducted in timed relationship with respect to the reciprocation of the pistons 15 and exhaust valves 18 to the exhaust manifolds or headers 17, which discharge through a muffler to the atmosphere. The left and right manifolds 17 are connected by a cross-over conduit 19 which conducts the hot exhaust gases into heat exchange relationship with portions 20 of the wall of the inlet header. The wall portions 20 extend transversely to the direction of flow of the inlet mixture and are commonly referred to as the "hot spot" which preheats the inlet mixture and enhances vaporization and mixing of liquid fuel droplets. A thermostatically controlled valve 21 in one header 17 controls the flow of hot gases in the cross-over conduit 19 so as to expedite heating of the hot spot 20 during the engine warm-up period and to prevent overheating during operation of the engine under load. The structure described thus far may be conventional.

Associated with each of the throttle valves 14 and extending through the hot spot 20 is a separate nozzle 22 having a restricted bypass or recycling orifice or conduit 23. The latter in cooperation with conduit 19 provide an interconnection between the exhaust and inlet headers 17, 12 to enable controlled recycling of a portion of the exhaust gas into the inlet fuel-air mixture. In the present instance, the orifices 23 have fixed restrictions dimensioned to pass at least 5% and not more than 25% of the total exhaust gases, depending upon the specific engine and its operating conditions. In the usual situation approximately 15% of the exhaust gases will be recycled as aforesaid.

Figure 2:
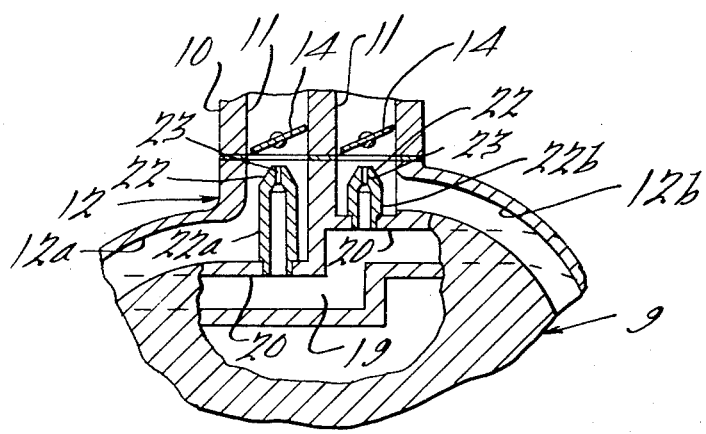

In climatic regions where icing is a problem, each nozzle 22 may be extended into proximity with its associated throttle valve 14 by means of an integral low resistance tubular stand pipe 22a or 22b having a length depending upon the specific geometry and location of the portion of the hot spot 20 through which it extends, FIG. 2. Each of the bypass orifices 23 may thus have the same resistance to gas flow.

In accordance with the construction illustrated in FIGURES 1 and 2, it is apparent that as the engine load increases, both the fuel supplied to the engine and the resulting exhaust will increase. Likewise the pressure differential between the inlet and exhaust headers will increase to effect an increase of the recycling of the exhaust gases through the bypass orifices 23, thereby to increase the dilution of the inlet mixture with increasing load and to increase the effectiveness of the system in reducing the emission of nitrogen oxides. In addition, the flow of the hot exhaust gases through the hot spot 20 and nozzles 22 facilitate preheating of the hot spot 20 and throttle valves 14 to assure vaporization of the inlet mixture and the prevention of ice formation adjacent the edges of the throttle valves 14. Simultaneously the recycled exhaust gases are cooled below the ignition temperature of the combustible inlet mixture. To this end the nozzles 22 are preferably of heat conducting material and are sufficiently long to achieve the necessary heat transfer from the exhaust gases to the hot spot and inlet mixture. Also by directing the exhaust gases directly in opposition to the flow of the inlet mixture, improved breaking up, dispersion and vaporization of liquid fuel droplets are achieved with consequent improved mixing of the combustible inlet gases and uniform predictable combustion characteristics within the cylinders 13.

FIGURES 3 and 4 illustrate modifications of the invention wherein the overall arrangements of the engine 9 and the inlet and exhaust headers 12, 17 are the same as in FIGURES 1 and 2. In FIGURES 3 and 4 a bypass or recycling conduit 23a is provided in series with the restricted orifices 23 to connect the same with conduit 19 and is controlled by a bypass or recycling valve 24 pivotally mounted within a throat of the conduit 23a on a shaft 24a. A crank arm 25 extends from the shaft 24a and is pivotally connected at its swinging end to a push rod 26, which in turn is connected with a pressure actuated diaphragm 27 comprising one wall of a vacuum chamber 28. The latter is in direct communication with the conventional distributor vacuum advance conduit 29 which opens at a vacuum advance port 30 into a portion of the induction conduit 11 adjacent or immediately upstream of the upper edge of one of the throttle valves 14. The other end of the conduit 29 communicates with a vacuum chamber 31 having one wall defined by a flexible diaphragm 32. The diaphragm 32 is conventionally biased at a neutral position by spring 33 when the chamber 31 is subject to approximately atmospheric pressure and is connected by means of an operating shaft 34 with the customary ignition spark distributor advance and retard mechanism 35 for advancing the ignition spark as the pressure in the chamber 31 decreases, i.e. as the throttle 14 opens. The mechanism 35 is also connected with spring loaded flyweights 36 rotatable on a central engine driven shaft for advancing the spark with increasing engine speed, the flyweights and the vacuum advance mechanism 30, 34 cooperate for advancing or retarding the ignition spark in accordance with combined engine load and speed conditions. The operation of the ignition advance-retard mechanism 35 and of the vacuum advance-retard mechanism 30, 34 likewise may be conventional and are accordingly not described in further detail.

The position of the diaphragm 27 is biased by a spring 37 within chamber 28 to resist vacuum induced movement until the pressure in chamber 28 falls approximately 5" of mercury below atmospheric pressure. At this pressure, the throttle valve 14 will be in the closed or idle position shown. Upon opening of the throttle valve 14, the pressure at port 30 and correspondingly within chamber 28 will fall. At a pressure of approximately 7" of mercury below atmospheric pressure within chamber 28, which corresponds normally to a very slight opening of throttle valve 14 to an accelerated idle position at one extreme and nearly wide open throttle at the other extreme, diaphragm 27 will shift to the right against the tension of spring 37, as illustrated in FIGURE 3, and thereby pull shaft 26 rightward and crank arm 25 clockwise to swing bypass valve 24 to the fully open position. Upon the opening of bypass valve 24, the bypass orifices 23 operate as in FIGURES 1 and 2 to control the recycling of exhaust gases into the inlet gases. A movement limiting screw 38 is provided to adjust the maximum opening of bypass valve 24.

In FIGURE 4, the structure and operation of the parts are the same as in FIGURE 3, except that the orifices 23 are elevated on integral low resistance standpipes 39 comparable to the standpipes 22a and 22b, so as to discharge the hot exhaust gases in proximity with the throttle valves 14 to prevent icing.

In the preferred operation of valve 24, the latter remains fully open throughout all operating conditions of the engine until the pressure at port 30 and chamber 28 rises to approximately 7″ of mercury below atmospheric pressure. Then with increasing pressure in chamber 28, the valve 24 closes rapidly to its position of maximum closure as the pressure rises to approximately 5″ of mercury below atmospheric pressure, which pressure corresponds either to idling as aforesaid or to high engine load conditions near wide open throttle, whereat the customary carburetor main fuel supply orifice is opened fully to provide fuel enrichment for power operation. Even at the closed position of valve 24, the latter may permit limited recycling of the exhaust gases to provide an anti-icing measure during idle operation.

In either of FIGURES 3 and 4 the valve 24 may comprise the sole restriction between the exhaust and inlet headers 17, 12, in which case the nozzle 22 would be comparatively unrestricted and would be employed merely to determine the direction of injection of the exhaust gases into the inlet mixture. In such a case, the valve 24 would be used with a suitable diaphragm 27 and biasing spring 37 for progressively opening and closing in accordance with progressively decreasing or increasing pressure respectively within the chamber 28 as determined by various operating conditions of the engine. Likewise if desired, the valve 24 may be employed in series with the fixed restrictions 23 and as described above for progressively opening conduit 23a with decreasing pressure at port 30, instead of opening fully at all pressures below a predetermined maximum amounting approximately to the aforesaid 7″ of mercury below atmospheric pressure.

We claim:
1. In an internal combustion engine,
   (A) an intake header for conducting a fuel-air mixture into said engine for combustion therein,
   (B) an exhaust header for discharging the combustion products from said engine,
   (C) and means for effectively inhibiting the formation of noxious oxides of nitrogen during said combustion by limiting the temperature thereof comprising bypass duct means connecting said exhaust and inlet headers,
   (D) bypass valve means for controlling the flow of said combustion products between said headers,
   (E) a pressure transmitting port opening into an upstream portion of the sidewall of said inlet header,
   (F) a throttle valve in said inlet header for controlling the flow of said fuel-air mixture therein,
   (G) said throttle valve having an edge
      (1) located adjacent said port to position the latter at the high pressure side of said throttle valve when said throttle valve is closed and
      (2) adapted to move progressively upstream of said port to position the latter at the low pressure side of said throttle valve upon predetermined opening of the latter, and
   (H) pressure actuated means in communication with said port and operably connected with said bypass valve means to operate the latter.
2. In the combination according to claim 1, a distributor vacuum control conduit in communication with said port for connecting the same with a pressure actuated ignition distributor timing means, and said pressure actuated means being connected with said distributor vacuum control conduit for actuation by the pressure at said port and operably connected with said bypass valve means for opening the same with decreasing pressure at said port.

3. In the combination according to claim 2, said pressure actuated means being operable at pressure greater than a valve closing pressure on the order of about five inches of mercury less than atmospheric pressure for closing said bypass valve and for progressively opening the latter with decreasing pressures below said valve closing pressure.

4. In the combination according to claim 3, said bypass duct means terminating within said inlet header proximate and downstream of said throttle valve in nozzle means for discharging said combustion products against said throttle valve to heat the latter.

5. In the combination according to claim 1, said bypass duct means terminating within said inlet header in nozzle means arranged for discharging the combustion products flowing therethrough against the flow of said fuel-air mixture in said inlet header.

6. In the combination according to claim 1, said pressure actuated means being operable at pressures at said port corresponding to operation of said engine at wide open throttle for substantially closing said bypass valve and being operable at pressures at said port corresponding to operation of said engine at a fast idle condition for partially opening said bypass valve means.

7. In the combination according to claim 1, said inlet header having a wall portion of heat conducting material in heat exchange relationship with said combustion products to receive heat therefrom and create a hot spot at said wall portion to enhance vaporization of fuel in said mixture, and said bypass duct means extending through said hot spot in heat exchange relationship therewith to enhance the heating thereof by said combustion products and to cool the latter prior to their admixture with said fuel-air mixture, the upstream portion of said inlet header comprising a fuel-air induction conduit extending transversely of said hot spot to direct said fuel-air mixture thereagainst to enhance said vaporization and the admixture of said combustion products with said fuel-air mixture, and said bypass duct means opening into said induction conduit in the direction for discharging said combustion products in opposition to the flow of said fuel-air mixture in said induction conduit.

8. In the combination according to claim 1, said pressure actuated means being operable at pressures greater than a valve closing pressure on the order of about five inches of mercury less than atmospheric pressure for closing said bypass valve and for progressively opening the latter with decreasing pressures below said valve closing pressure.

References Cited
UNITED STATES PATENTS
1,768,854  7/1930  Moore.
2,287,593  6/1942  Ball.
2,317,582  4/1943  Bicknell.
2,154,417  4/1939  Anderson.
2,543,194  2/1951  Paris.

FOREIGN PATENTS
531,637  11/1941  Great Britain.

MEYER PERLIN, *Primary Examiner.*